United States Patent Office 3,062,435
Patented Nov. 6, 1962

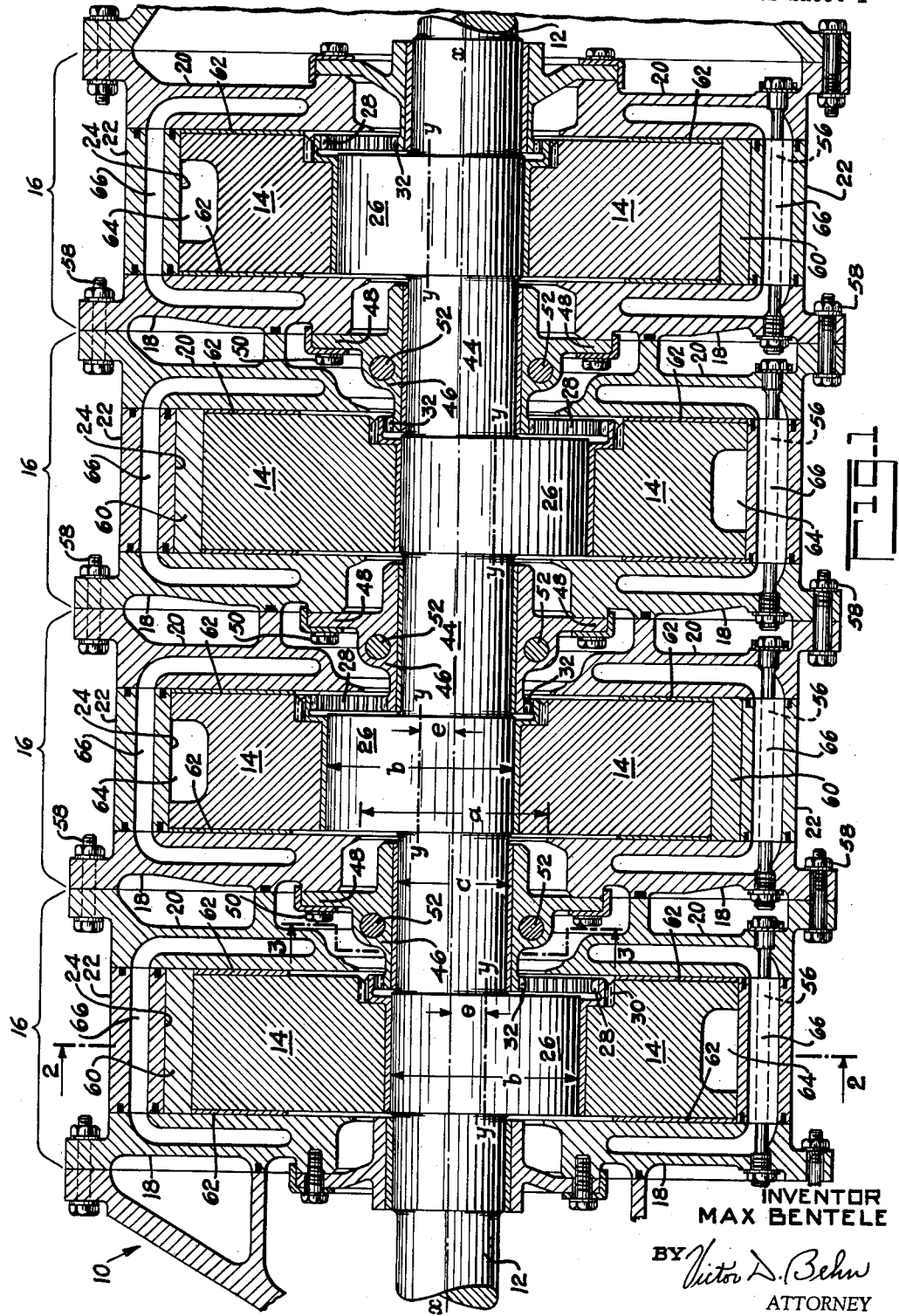

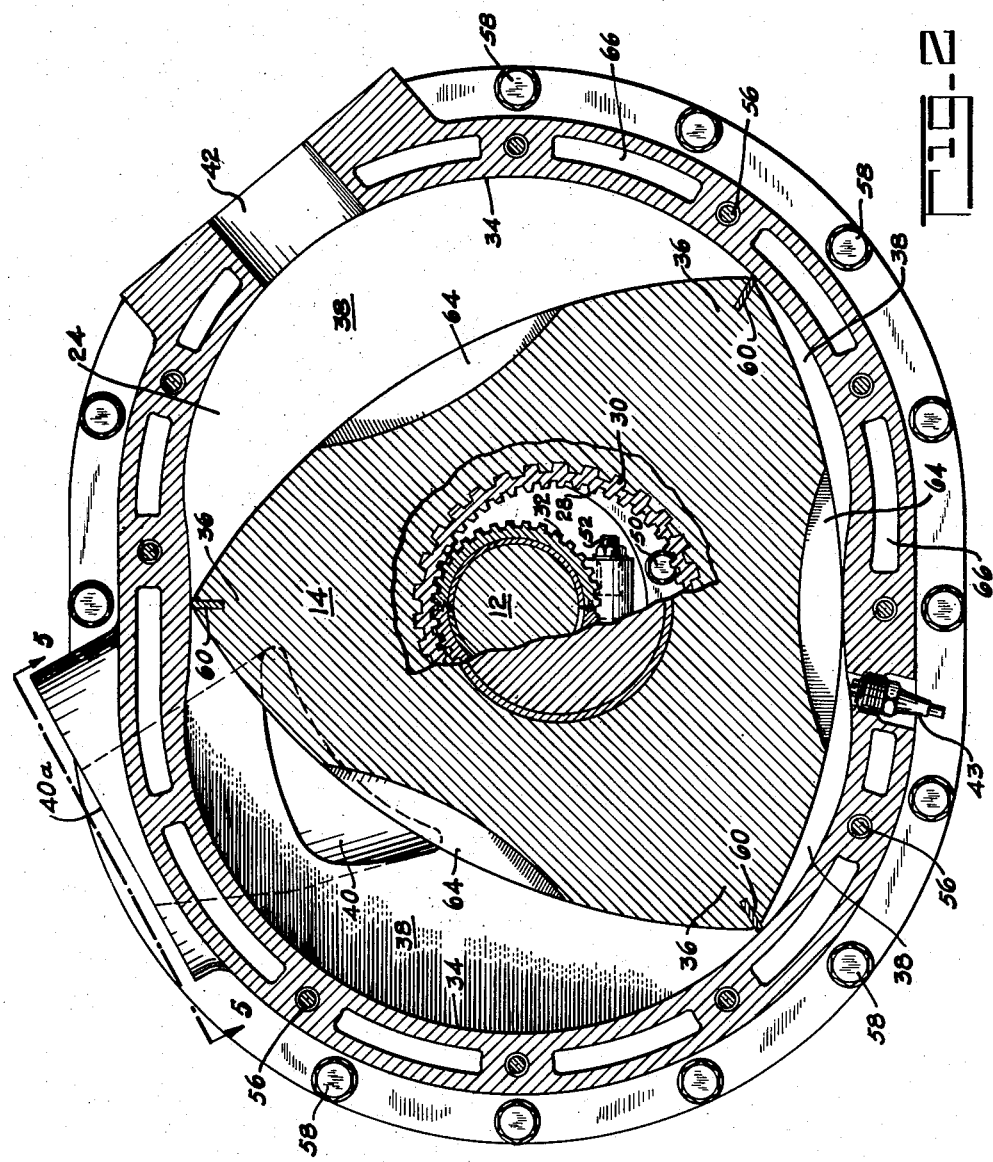

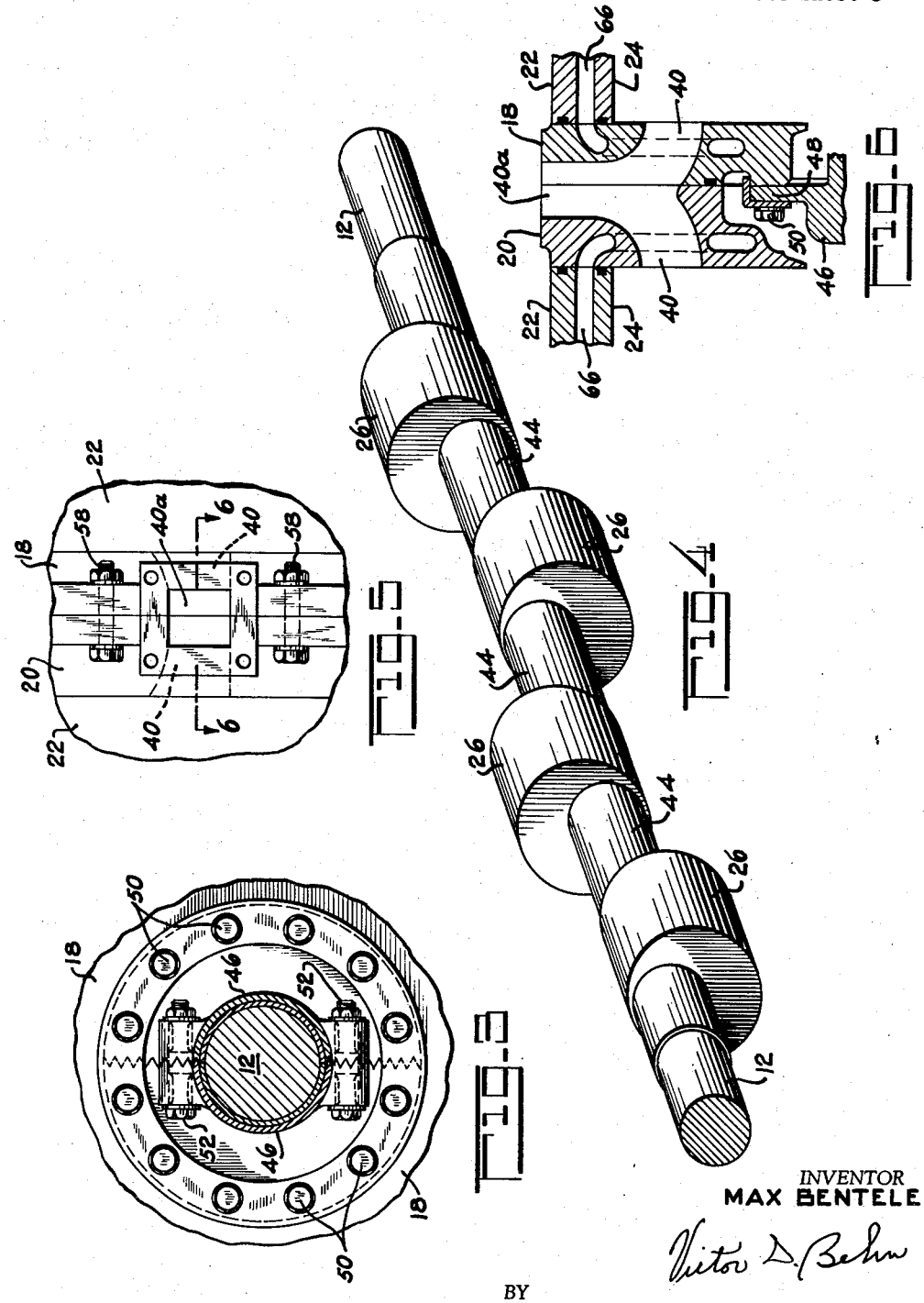

3,062,435
MULTI-UNIT ROTARY ENGINE
Max Bentele, Ridgewood, N.J., assignor to Curtiss-Wright Corporation, a corporation of Delaware
Filed Nov. 17, 1959, Ser. No. 853,560
7 Claims. (Cl. 230—145)

The invention relates to rotary mechanisms, such as pumps, fluid motors and internal combustion engines, and is particularly directed to such mechanisms comprising a housing within which a rotor rotates with and about an eccentric or crank portion of a crankshaft drivably connected to said rotor. Such mechanisms are known in the prior art, for example, as disclosed in Patent No. 2,880,045 and in co-pending application Serial No. 774,517 filed November 17, 1958, now U.S. Patent 2,988,065.

For convenience, the invention is described in connection with an internal combustion engine design. As will become apparent, however, the invention is also applicable to other forms of such rotary mechanisms such as fluid motors and pumps.

In a known form of such a rotary internal combustion engine, a housing, which may be fixed, has a cavity with flat and parallel end walls disposed transverse to the crankshaft axis and an inner or peripheral wall interconnecting the outer portions of said end walls. The inner surface of said peripheral wall defines an epitrochoid having a plurality of circumferentially-spaced lobes. The rotor of such an engine is received within said cavity and has parallel axially-spaced end walls, and the periphery of the rotor has a plurality of tooth-like projections the peaks or apex portions of which engage the peripheral wall of the housing cavity to form a plurality of working chambers between the rotor and said peripheral wall. The engine also includes suitable intake port for admitting fuel and air to said chambers to form a combustion mixture therein, means for igniting said mixture, and a suitable exhaust port.

During engine operation, the rotor has a planetary motion within the housing cavity and about the crankshaft axis. This motion results in the rotor apex portions sliding along the peripheral wall of the housing cavity to vary the volume of said working chambers. The engine porting and ignition means preferably are disposed so that during engine operation the working fluid of the engine undergoes the sequence of intake, compression, combustion and expansion, and exhaust—similar to that which takes place in conventional reciprocating-type piston and cylinder internal combustion engine.

The output of a conventional piston and cylinder reciprocating-type internal combustion engine can be increased by adding additional piston and cylinder combinations. Similarly the output of said rotary-type internal combustion engines can be increased by adding rotor and housing units, for example, by coupling the shafts of a plurality of said housing and rotor units together. It has also been proposed to construct such a multi-unit rotary engine with a housing having a plurality of cavities for a corresponding number of rotors. For assembly reasons said prior construction required a split crankshaft construction. With a split crankshaft construction, however, the engine crankshaft is structurally weak and in addition assembly of the engine is difficult.

An object of the present invention comprises the provision of a multi-unit rotary engine having a novel multi-part housing construction permitting the use of a one piece engine crankshaft.

A further object of the invention comprises the provision of a novel split bearing and gear combination such that the journal portions of the one piece crankshaft may be disposed within said bearing and gear combination.

Other objects of the invention will become apparent upon reading the annexed detailed description in connection with the drawing in which:

FIG. 1 is an axial sectional view through a rotary piston engine embodying the invention;
FIG. 2 and 3 are sectional views taken along line 2—2 and line 3—3 respectively of FIG. 1;
FIG. 4 is a perspective view of the engine crankshaft;
FIG. 5 is a view taken along line 5—5 of FIG. 2; and
FIG. 6 is a sectional view taken along line 6—6 of FIG. 5.

Referring to the drawing, a rotory-type internal combustion engine 10 comprises a one piece crankshaft 12 which extends through a plurality of rotor and housing units each consisting of a rotor 14 and a fixed housing 16, the housings of said units being co-axial. Four such units are illustrated although as will become apparent the invention is applicable to a rotary engine having any plural number of such units and particularly to an engine having at least three such units.

Each housing 16 comprises a pair of axially-spaced annular end members 18 and 20 and a peripheral member 22 secured between the radially outer portions of said annular members to form an inwardly opening cavity 24. The facing inner surfaces of the annular end members form axially-spaced end walls of said cavity, said end walls being flat and disposed transverse to the crank shaft axis. The inner surface of said peripheral member 22 has a profile of an epitrochoid, as is described in said copending application.

Each housing cavity 24 has its associated rotor 14 received therein for planetary motion within said cavity about the crankshaft axis. The crankshaft 12 has a plurality of eccentric, cylindrical or crank portions 26 which are axially-spaced along the crankshaft, there being one such eccentric portion for each rotor 14 and on which said rotor is journaled. The general structure of the crankshaft is best seen in FIG. 4. As shown in FIG. 1, the axis $y$—$y$ of each crank portion 26 is parallel to the crankshaft axis $x$—$x$, and is spaced therefrom a distance $e$ whereby said distance $e$ is the eccentricity of the axis of each crank portion 26 relative to the crankshaft axis. The axis of each housing unit cavity 24 co-incides with the crankshaft axis $x$—$x$.

Each rotor 14 has an internal gear 28 secured thereto as by splines 30 for rotation with said rotor, each gear 28 being concentric with its rotor, that is with $y$—$y$ axis of its associated rotor. Each said internal gear 28 is disposed about and in meshing engagement with a fixed gear 32 concentric with the crankshaft axis $x$—$x$.

In the embodiment illustrated, each pair of gears 28 and 32 has a diameter ratio of 3 to 2 in which case the epitrochoid inner surface of the peripheral wall 22 of each housing cavity 24 has two circumferentially-spaced lobes 34 and each rotor 14 has three tooth-like projections 36, the apex portions of which engage said peripheral wall. Three working chambers 38 are thus formed between the peripheral wall of each cavity 24 and the rotor 14 within said cavity. The epitrochoidal profile of the peripheral wall of each housing cavity 24 and the profile of each rotor 14 are more fully explained in said copending application.

Each cavity 24 is provided with an engine intake port 40 for admission of air and fuel to the engine working chambers 38, said intake port 40 opening into the cavity 24 through one and/or both of its end walls 18 and 20. Each cavity 24 also has an exhaust port 42 extending radially outwardly through its peripheral wall member 22. As illustrated in FIG. 2 said intake and exhaust ports 40 and 42 for each housing cavity open into said cavity on opposite sides of and adjacent to one of the junctions of the two epitrochoid lobes 34 of said cavity. In addition each housing cavity 24 is provided with a spark plug 43 for igniting the combustion mixture in the working chambers 38 of said cavity, each spark plug being located adjacent to the other junction of the two lobes 34 of said housing cavity and being mounted in the housing wall 22.

As fully described in said copending application each such rotor and housing unit can function as an internal combustion engine. In the case of the embodiment illustrated, the charge in each working chamber 38 will undergo the same sequence of intake, compression, combustion and expansion, and exhaust as in a four-stroke cycle internal combustion engine of the conventional piston type. Each rotor 14, through its crank portion 26 will serve to drive the crankshaft 12 but the rotational speed of each rotor 14 about the crankshaft axis will only be one-third the speed of said crankshaft 12.

A plurality of engine units 14, 16 are connected to the same crankshaft 12 whereby the available power output of the power plant is substantially equal to that available from one of said units multiplied by the number of said units. As already stated the crankshaft 12 has one-piece construction with a plurality of crank portions 26 and in addition has a journal portion 44 between each pair of adjacent crank portions 26.

In order to provide maximum overlap between each rotor 14 and the end wall members 18 and 20 of its cavity 24, the internal diameter of said end walls is made as small as possible and yet permit said wall end members to be assembled in position by sliding said members over the crankshaft crank portions 26. In other words the internal diameter $a$ of each end member 18 and 20 is slightly larger than the diameter $b$ of each crankshaft crank portion 26.

Also, in order to permit the crankshaft crank portions 26 to be accurately machined without interference from the crankshaft journal portions 44, the difference between the radius $b/2$ of each crankshaft crank portion 26 and the eccentricity $e$ preferably is made at least slightly greater than the radius $c/2$ of said crankshaft journal portions 44.

A bearing 46 is provided for each crankshaft journal portion 44 between the crank portions 26. As illustrated, each such bearing 46 is a plain or sleeve-type bearing and has a radially outwardly extending flange 48 which is secured to one of the adjacent fixed housing members 18 or 20 as by screws 50. Since the diameter $c$ of each crankshaft journal portion 44 is less than the diameter $b$ of the adjacent crank portions 26, each bearing 46 is split into two semi-circular halves to permit their assembly about said journal portions. Each bearing 46 is mounted so that its split ends are disposed in regions of minimum bearing loads. The two halves of each bearing are secured together as by bolts 52. The abutting end faces of each bearing half preferably have interfitted ribs 54 for accurate alinement of said halves.

Like each bearing 46, each fixed gear 32 is also split into two semi-circular halves for reasons of assembly, each half of the adjacent bearing 46 having one half of said gear 32 formed integral therewith. This makes a simple and compact split bearing and gear combination and permits the use of a one piece crankshaft 12.

With the structure described, the engine housing members, rotors and journal bearings may obviously be assembled about the one piece crankshaft 12. For example, starting at the right end of FIG. 1, the first housing and rotor unit 16, 14 is assembled about the crank portion 26, at the right end of the crankshaft. The members of this first housing and rotor unit 16, 14 may be assembled from either end of the crankshaft. The housing members 18, 20 and 22 of the housing 16 of this first unit are then secured together by bolts 56 with the rotor 14 of said unit being received within the housing cavity 24 of said unit. A combination bearing 46 and gear 32 is then assembled about the adjacent crankshaft journal 44 and is secured to the adjacent housing member 20 by the screws 50.

The second from right housing and rotor unit 16, 14 is then assembled about the crankshaft from the left end of said shaft. The housing member 20 of the housing 16 of said second unit is first bolted to the housing member 18 of the right end unit 16 by bolts 58. Then the three housing members 18, 20 and 22 of said second housing 16 are secured together by bolts 56 with the rotor 14 of said second unit being received within the cavity 24 of said second housing. The adjacent bearing 46 with its gear 32 is assembled as described above.

The remaining housing and rotor units 16, 14 are assembled one after the other with the adjacent bearing and gear units 46, 32 in a similar manner.

Suitable dowels or other locating means (not shown) are provided for co-axially locating the various housing members 18, 20 and 22 and for determining their angular position about the engine axis $x$—$x$. Also, in lieu of the bolts 56 and 58 for each housing unit 16, through bolts may be provided for securing the housing members of all the units together. For example, a through bolt could be substituted for each tandem disposed set of bolts 56 in which case the bolts 58 and associated flanges would not be required.

As illustrated the axis of each crank portion 26 is rotatively displaced 180° from the axis of each adjacent crank portion 26. As will become apparent, however, the invention is not limited to any particular arrangement of the relative angular positions of the crankshaft crank portions 26. As already stated the axis of each housing unit cavity 24 coincides with the crankshaft axis $x$—$x$. Also, as illustrated in FIG. 2, the housing cavities 24 all have the same angular position relative to the crankshaft axis. With this arrangement, the intake ports for all the cavities 24 are located axially one behind the other and the exhaust ports are similarly alined. It is obvious, however, that the housing cavities may be angularly displaced relative to each other with respect to the crankshaft axis.

As best seen in FIG. 5, the abutting end wall members 18 and 20, of each pair of adjacent housing cavities 24, each have an intake port with said ports merging with a common inlet 40a at the outer periphery of said wall members. As best seen in FIGS. 5 and 6 each common inlet 40a straddles the junction of its wall members 18 and 20 and then divides into two inlet ports 40 for the two adjacent housing cavities 24. This construction makes for a very compact arrangement.

As illustrated, suitable seals 60 are disposed along the apex portions 36 of each rotor 14 and seals 62 provided between each rotor 14 and the adjacent end walls 18 and 20.

With this structure described, although the housing structure has a multi-part construction to facilitate assembly over the one piece crankshaft 12, the housing end walls 18 and 20 and peripheral wall 22 present smooth surfaces to their respective rotors and seals 60 and 62. Thus said peripheral and end wall surfaces are one-piece continuous surfaces and are uninterrupted except for the intake and exhaust ports 40 and 42 opening therethrough.

As is conventional in rotary engines of the type disclosed, each rotor also has grooves 64 formed on each side substantially midway between each adjacent pair of apex portions 36. The drawings also illustrate the various housing members as having a plurality of passages 66 for flow of a coolant therethrough.

The invention has been described in connection with a housing and rotor units in which each housing cavity 24 has a two-lobed epitrochoid inner periphery and each rotor 14 has three apex portions 36. As will be apparent, however, the invention is not so limited. For example, as disclosed in said co-pending application each housing cavity may have three-lobed epitrochoid inner periphery with each rotor having four apex portions.

While I have described my invention in detail in its present preferred embodiment, it will be obvious to those skilled in the art, after understanding my invention that various changes and modifications may be made therein without departing from the spirit or scope thereof. I aim in the appended claims to cover all such modifications.

I claim as my invention:

1. A rotary mechanism comprising a multi-part housing structure having at least three axially-spaced cavities with each said cavity being formed by axially-spaced end walls and a peripheral wall; a one-piece crankshaft extending through said housing cavities with said crankshaft having a three axially-spaced crank portions each having its axis spaced from but disposed parallel to the crankshaft axis, there being one such crank portion for and alined with each housing cavity, the inner surface of each of said housing walls having an integral construction surrounding said one-piece shaft such that for assembly purposes the shaft must be inserted through said walls; three rotor members, one for each housing cavity and journaled on the associated crankshaft crank portion for planetary motion about the crankshaft axis with each said rotor member having sealing engagement with the end and peripheral walls of its housing cavity, the inner surface of the peripheral wall of each housing cavity having a multi-lobed profile and each rotor member having a plurality of circumferentially-spaced apex portions having continuous sealing engagement with the multi-lobed inner surface of its housing cavity peripheral wall to form a plurality of working chambers between each rotor member and the walls of its housing cavity; a plurality of internal gears, one for and secured to each rotor member; a plurality of fixed gears, one for and meshing with each internal gear, each fixed gear being secured to said housing structure and being coaxial with the crankshaft axis with each fixed gear having an inner diameter less than the diameter of said crankshaft crank portions, and each fixed gear, meshing with the internal gear of a rotor member journaled on a crank portion of said crankshaft disposed between the end crank portions, being split axially for assembly about the crankshaft, the housing wall structure disposed between a pair of housing cavities and disposed adjacent to said split gear being split transversely of the shaft axis into two end wall sections and said split gear having a portion received between said two end wall sections for attachment to one of said two end wall sections.

2. A rotary mechanism as claimed in claim 1 and including a bearing for said crankshaft and disposed adjacent to said split gear, said bearing also being split axially for assembly about the crankshaft.

3. A rotary mechanism as claimed in claim 2 and in which said split bearing and split gear are rigidly secured together into a combination gear and bearing.

4. A rotary mechanism as claimed in claim 3 and in which the circumferential abutting ends of the parts of said split gear and bearing are serrated for rigid securement of said ends together.

5. A rotary mechanism as claimed in claim 4 and in which said split bearing and gear is split into two semi-cylindrical halves.

6. A rotary mechanism as claimed in claim 3 in which said combination bearing and gear is split into two semi-circular halves with each gear half having a one-piece construction with a bearing half.

7. A rotary mechanism as claimed in claim 2 and in which each portion of said split gear and the adjacent portion of said split bearing have a one-piece construction.

References Cited in the file of this patent

UNITED STATES PATENTS

| | | |
|---|---|---|
| 638,910 | Couture | Dec. 12, 1899 |
| 669,458 | Fisher et al. | Mar. 5, 1901 |
| 1,247,700 | Mehle | Nov. 27, 1917 |
| 1,434,446 | McQueen | Nov. 7, 1922 |
| 1,636,486 | Planche | July 19, 1927 |
| 1,686,569 | McMillan | Oct. 9, 1928 |
| 2,066,394 | Daub | Jan. 5, 1937 |

FOREIGN PATENTS

| | | |
|---|---|---|
| 557,902 | Great Britain | Dec. 9, 1943 |
| 1,125,876 | France | July 16, 1956 |
| 1,188,135 | France | Mar. 9, 1959 |